(12) United States Patent
Serra Obiol et al.

(10) Patent No.: US 11,802,009 B2
(45) Date of Patent: Oct. 31, 2023

(54) TROLLEY DEVICE FOR CONVEYING LAMINAR ELEMENTS AND CONVEYOR ASSEMBLY

(71) Applicant: COMERCIAL INDUSTRIAL MAQUINARIA CARTON ONDULADO, S.L., Martorell (ES)

(72) Inventors: Ramon Serra Obiol, Martorell (ES); Jaume Pugès Triguero, Martorell (ES); Jordi Puig Vargas, Martorell (ES)

(73) Assignee: COMERCIAL INDUSTRIAL MAQUINARIA CARTON ONDULADO, S.L., Martorell (ES)

( * ) Notice: Subject to any disclaimer, the term of this patent is extended or adjusted under 35 U.S.C. 154(b) by 55 days.

(21) Appl. No.: 17/518,788

(22) Filed: Nov. 4, 2021

(65) Prior Publication Data
US 2022/0135342 A1   May 5, 2022

(30) Foreign Application Priority Data

Nov. 5, 2020   (ES) .............................. ES202032386U

(51) Int. Cl.
| | |
|---|---|
| *B65G 47/91* | (2006.01) |
| *B65G 15/42* | (2006.01) |
| *B65G 17/46* | (2006.01) |
| *B65H 29/32* | (2006.01) |
| *B65G 47/61* | (2006.01) |

(52) U.S. Cl.
CPC .................................. *B65G 47/61* (2013.01)

(58) Field of Classification Search
CPC ........ B65G 15/42; B65G 17/46; B65G 47/61; B65G 47/91; B65H 29/32; B65H 29/242
USPC .......................... 198/602, 689; 271/196, 197
See application file for complete search history.

(56) References Cited

U.S. PATENT DOCUMENTS

| | | | | |
|---|---|---|---|---|
| 4,080,053 | A | * | 3/1978 | Friday ................ G03G 15/1655 399/92 |
| 4,304,508 | A | * | 12/1981 | Wolf ...................... B65G 47/28 198/689.1 |
| 4,480,742 | A | * | 11/1984 | Muylle .................. B65G 35/04 198/689.1 |
| 4,555,013 | A | * | 11/1985 | Franklin ................ B65G 15/42 198/689.1 |
| 4,614,512 | A | * | 9/1986 | Capdeboscq ........... B31B 50/36 198/405 |
| 4,647,033 | A | * | 3/1987 | Emrich .................... B65H 5/24 271/197 |
| 5,562,281 | A | * | 10/1996 | Honda ................... B65H 29/68 271/220 |

(Continued)

*Primary Examiner* — Douglas A Hess
(74) *Attorney, Agent, or Firm* — Hassan Abbas Shakir; Shakir Law PLLC

(57) ABSTRACT

A trolley device is used to convey laminar elements. The trolley device includes at least one belt that defines a closed loop, a plurality of pulleys, at least one drive pulley being configured to act on the belt, the pulleys being mounted on a frame with a supporting region over which a section of the belt can be slid and wherein suction means linked to the belt are provided. The belt includes at least on the outer face thereof a projecting section of predetermined length that protrudes in height with respect to the rest of the belt, the projecting section being provided with a plurality of through holes aligned in position with through holes made in the belt.

9 Claims, 4 Drawing Sheets

(56) References Cited

U.S. PATENT DOCUMENTS 10,106,349 B2 * 10/2018 Mueller .................. B65H 5/04
10,683,180 B2 * 6/2020 Serra Obiols ............ B65H 3/34

* cited by examiner

FIG.3
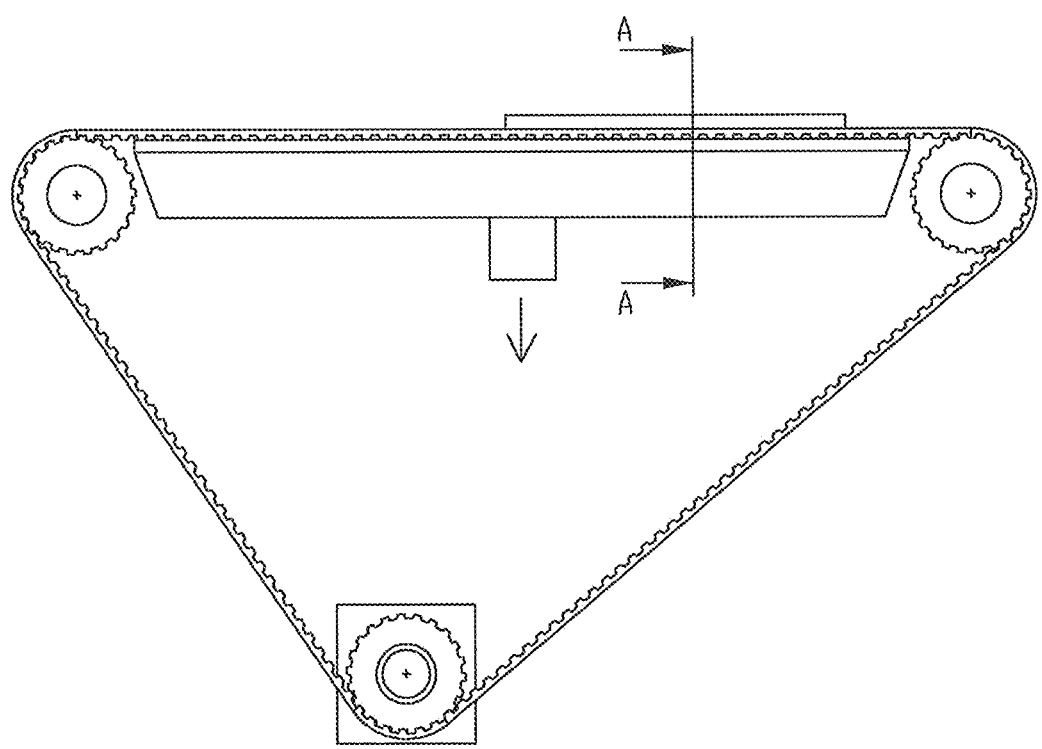
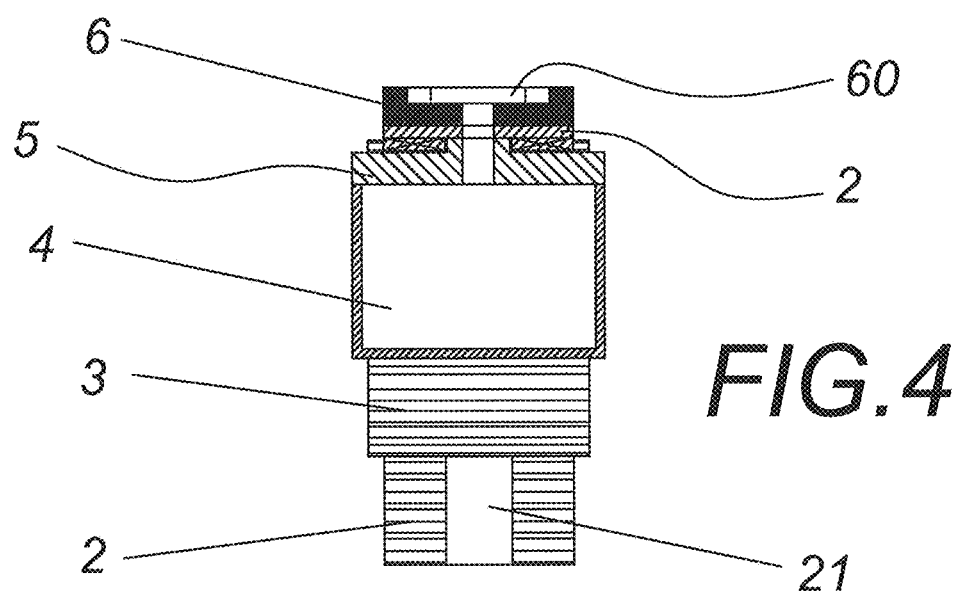
FIG.4
SECCIÓN A-A

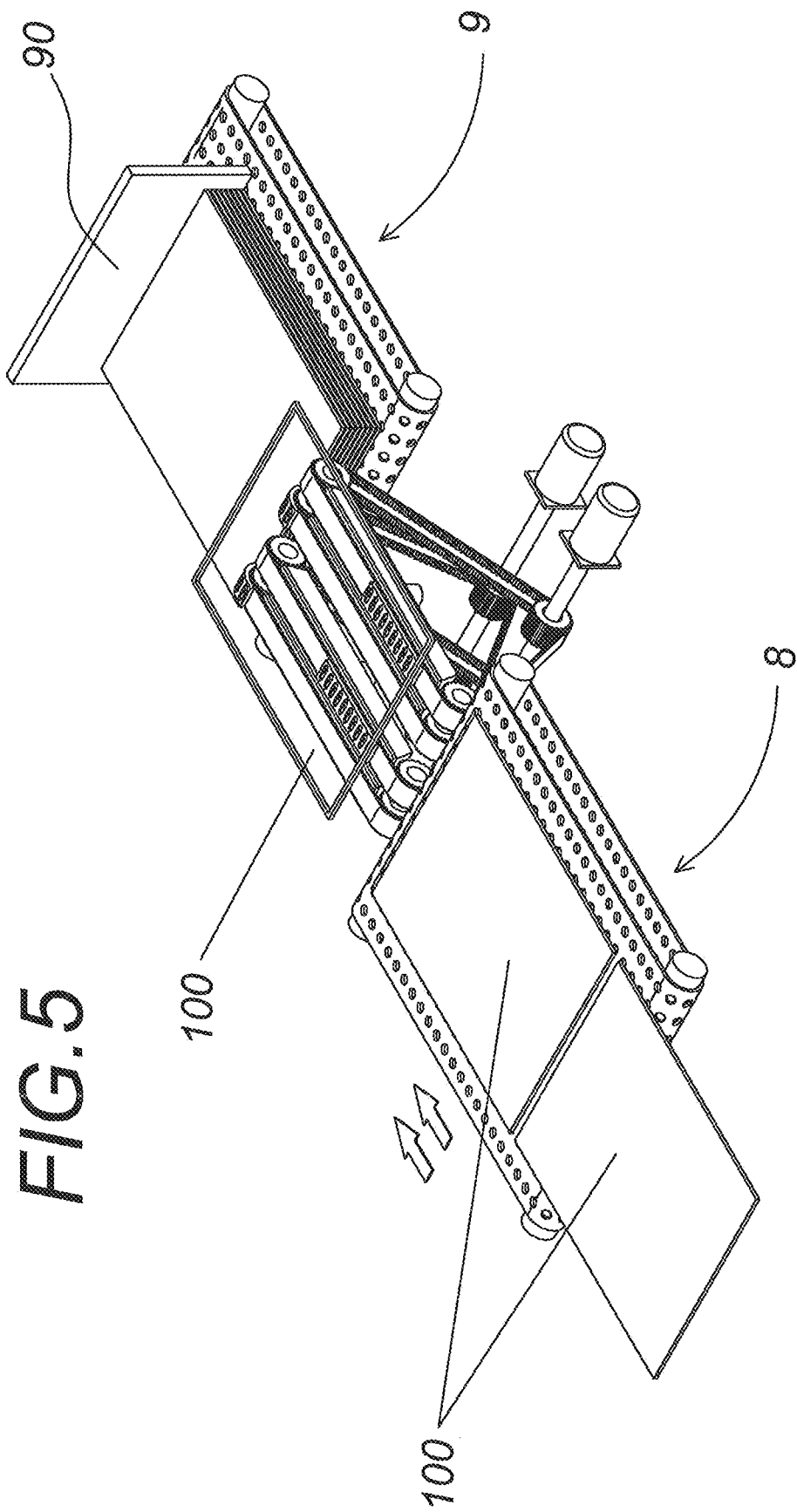

TROLLEY DEVICE FOR CONVEYING LAMINAR ELEMENTS AND CONVEYOR ASSEMBLY

FIELD OF THE INVENTION

The invention is directed to a trolley device intended for conveying laminar elements, such as cardboard sheets, as well as a conveyor assembly that is provided with at least one trolley device.

More specifically, the invention proposes the development of a trolley device that is capable of performing work operations with a high degree of precision and without generating friction between the laminar material to be handled and the existing conveyor system between different workstations in an in-line manufacturing process, thus maintaining the quality of the surface and printing of the laminar material to be handled (in the case of applying graphic prints on a surface of the laminar element).

BACKGROUND OF THE INVENTION

In processes of handling laminar material, such as for example cardboard panels or sheets, it is common for it to undergo various handling processes in different workstations, such as the printing of at least one of the surfaces thereof, said sheets being conveyed from one station to another by devices such as rollers, belts, straps, etc. depending on the use of one device or another with different factors such as economic cost, required precision, stiffness of the laminar material, degree of flatness required, etc.

During the different processes of handling the laminar material, it is common to modify the speed or spacing between the cardboard panels according to the stage of the process in which it is found. Said speed change is usually carried out by steps in speed between two conveyor systems, such that unwanted friction and loss of precision can be generated since they can damage the cardboard panel.

It may also be the case that a workstation, for example for printing or die-cutting, must be completely free just after receiving the cardboard panel so that there are no interferences that may compromise the precision of said process.

Furthermore, the applicant is currently unaware of an invention that has all the features described in this specification.

SUMMARY OF THE INVENTION

The present invention has been developed with the aim of providing a trolley device which is configured as a novelty within the field of application and solves the previously mentioned drawbacks, further contributing other additional advantages which will be obvious from the description below.

An object of the present invention is therefore to provide a trolley device for conveying laminar elements, being of the type comprising at least one belt that defines a closed loop, a plurality of pulleys, at least one drive pulley being configured to act on the belt, the pulleys being mounted on a frame with a supporting region over which a section of the belt can be slid and wherein suction means linked to the belt are provided. In particular, the invention is characterized in that the belt comprises at least on the outer face thereof a projecting section of predetermined length that protrudes in height with respect to the rest of the belt, the projecting section being provided with a plurality of through holes aligned in position with through holes made in the belt.

Thanks to these features, it is possible to convey the laminar material without pairs of rollers that cause unwanted "lamination" and crushing of the material which can negatively affect its physical properties, since in no case is the top surface of the material touched, such that the printing or surface treatment that the laminar material may have received in a previous process is not damaged either. Furthermore, this device enables a high degree of precision to be provided if required, depending on the material to be handled and the desired degree of quality.

Preferably, the belt of the trolley device comprises a plurality of projecting sections spaced apart and distributed along the length of the belt.

Advantageously, the supporting region includes windows associated with the suction means, said windows being configured for fluid communication between the suction means and the through holes made in the projecting sections, including a sealing system between the supporting region and the belt.

Preferably, the sealing system can comprise a longitudinal ribbing arranged along the length of the supporting region, which defines a central space wherein the windows are arranged, and wherein the inner face of the belt has two longitudinal ribs parallel and spaced a distance from each other, such that they are in physical contact with the sides of the longitudinal channel. Therefore, it is a simple manufacturing system that enables manufacturing costs to be reduced, ensuring airtightness for the correct operation of the suction system to support the laminar elements or bodies during the movement thereof in the forward direction.

Another object of the invention is to provide a conveyor assembly for conveying laminar elements, characterized by including at least one trolley device such as the one described above, suction means and drive means that act on at least one drive pulley of the trolley device.

According to another feature of the conveyor assembly, it includes a main frame where at least one trolley device is mounted by means of clamping plates mounted on the lateral sides of the trolley device.

According to another aspect, the conveyor assembly comprises a plurality of trolley devices that can act in a synchronized manner, being arranged in series, or a plurality of trolley devices arranged parallel to each other, or alternatively, a plurality of trolley devices arranged in series and in parallel. In this way, the conveyor assembly can be adapted to the width of the laminar elements or bodies. In addition, it enables speeding up and slowing down a succession of laminar elements in order to increase or decrease the space existing between two adjacent laminar elements during the in-line manufacturing process and, subsequently, deliver the laminar elements at a lower speed to a workstation.

Preferably, the trolley device can comprise two belts arranged parallel to each other, wherein each of the belts is associated with a plurality of pulleys that act in a synchronized manner.

Thus, the trolley device described represents an innovative structure with structural and constituent features heretofore unknown for its intended purpose, reasons which, taken together with its usefulness, provide it with sufficient grounds for obtaining the requested exclusivity privilege.

Other features and advantages of the trolley device object of the present invention will be evident in light of the description of a preferred, but not exclusive, embodiment which is illustrated by way of a non-limiting example in the drawings which are attached, wherein:

BRIEF DESCRIPTION OF THE DRAWINGS

FIG. 3 is an elevation view of the trolley device shown in FIGS. 1 and 2;

FIG. 4 is a cross-sectional view of a section indicated in FIG. 3 with the line A-A; and FIG. 5 is a perspective view of an example of application of the trolley device mounted in a cardboard panel handling facility.

DESCRIPTION OF A PREFERRED EMBODIMENT

In light of the aforementioned figures, and in accordance with the adopted numbering, one may observe therein a preferred exemplary embodiment of the invention, which comprises the parts and elements indicated and described in detail below.

Figure 1:
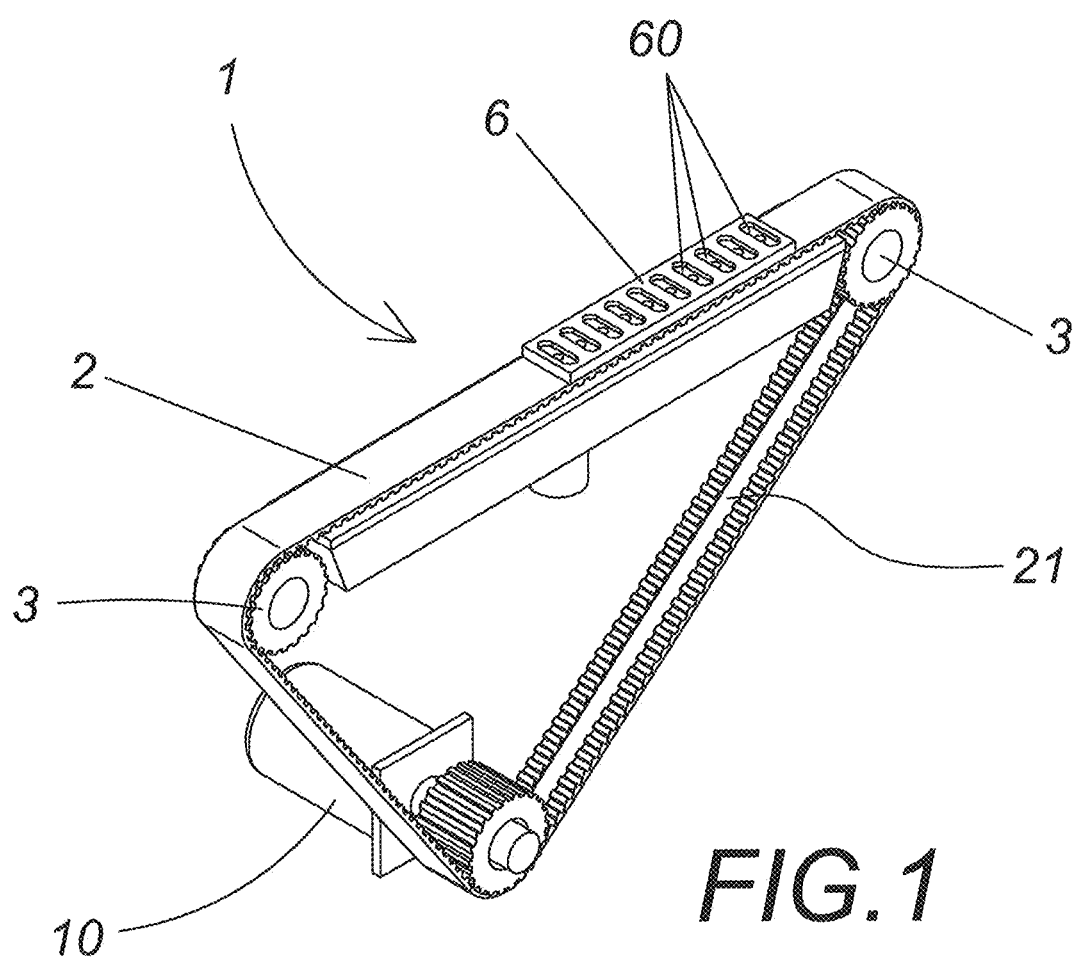
FIG. 1 is a schematic perspective view of the trolley device according to the present invention.
Figure 2:
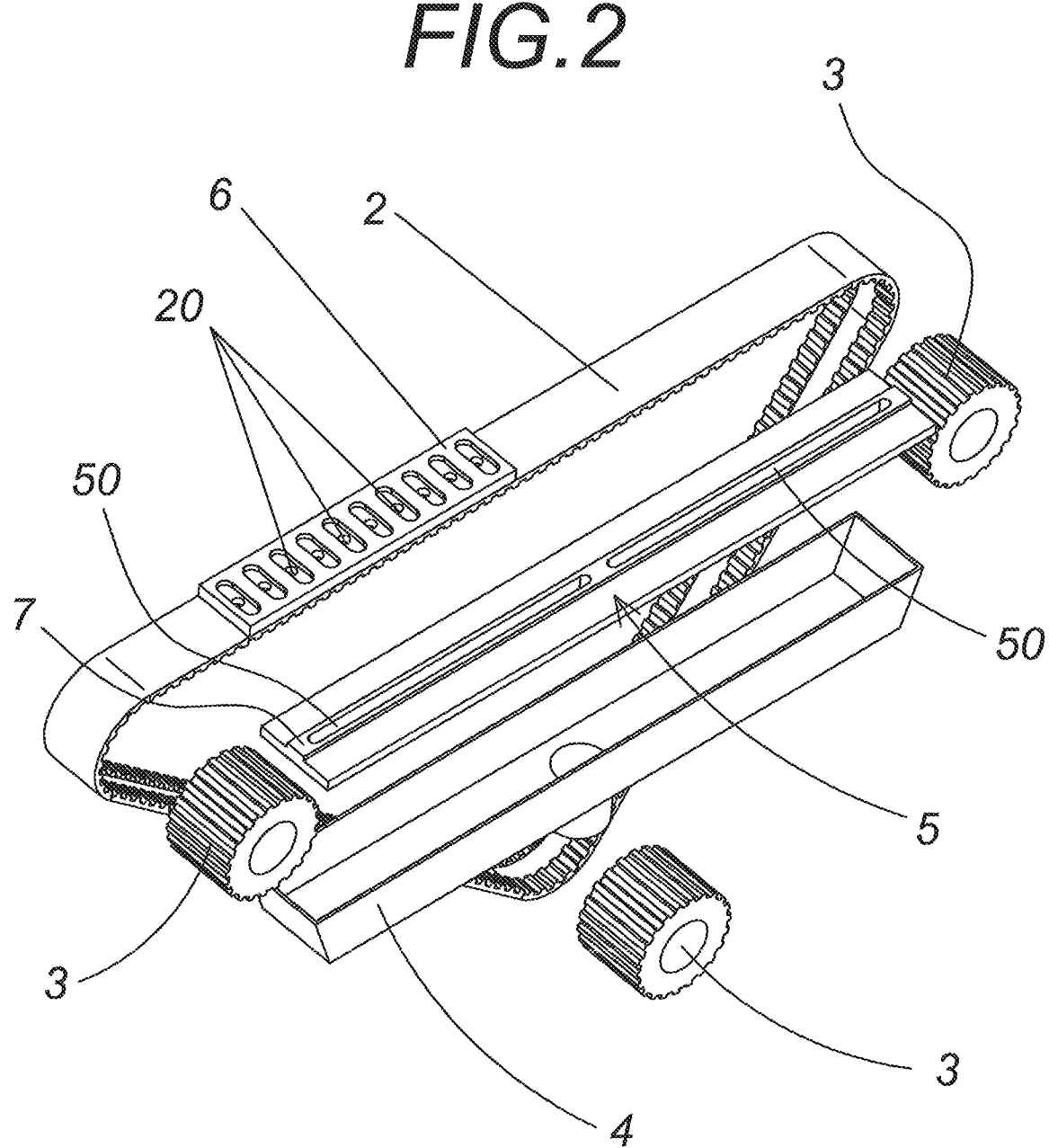
FIG. 2 is an exploded perspective view of the trolley device represented in FIG. 1.

The trolley device, generally indicated with the reference (1), is configured to facilitate the movement of laminar elements, such as for example cardboard sheets, between different stations in a cardboard sheet manufacturing and handling line. As can be seen in FIG. 1, this trolley device (1) comprises a belt (2) that defines a closed loop, a plurality of pulleys (3) with a toothed contact surface, at least one drive pulley being configured to act on the belt (2), by means of a servomotor (10), the pulleys being mounted by means of shafts in a frame (4) with a supporting region (5) arranged at the top over which a section of the belt can be slid and wherein suction means linked to the belt (2) are provided.

The belt (2) comprises on the outer face thereof a projecting section (6) of predetermined length that protrudes in height with respect to the rest of the belt (2), the projecting section (6) being provided with a plurality of through holes (60), distributed along the length of said projecting section (6), which are aligned in position with through holes (20) made in the belt (2).

It is possible that the belt (2) comprises a plurality of projecting sections (6) spaced apart and distributed along the length of the belt (2).

The supporting region (5) includes windows (50) (formed by through holes) associated with the suction means, said windows (50) being configured to facilitate fluid communication between the suction means (not shown) and the through holes (60) made in the projecting sections (6), further including a sealing system between the supporting region and the belt (2) to ensure the correct suction effect during the operation of the trolley device (1).

Now, with particular reference to the sealing system, it comprises a longitudinal ribbing (7) arranged along the length of the supporting region (5), which defines a central area wherein the windows are arranged, over which a bottom smooth surface of the belt formed in a preferred embodiment by a central channel (21) made in the toothing of the belt (2) slides and over which a sliding material is adhered. Furthermore, said central channel (21) fits with the longitudinal ribbing (7) of the central area of the supporting region (5) such that it also acts as a guide.

FIG. 5 shows the arrangement of a plurality of trolley devices arranged in parallel which have the purpose of reducing the speed of cardboard panels (100) from a first conveyor, generally indicated with the reference (8), to a second conveyor, generally indicated with the reference (9), provided with a stop (90), forming part of a stacking station in a cardboard panel handling facility. In this example, the trolley devices work in pairs. The operation of the set of trolley devices is as follows:

The projecting sections (6) of a pair of trolley devices (1) initially convey the cardboard panel (100) at a constant speed. The projecting sections (6) of the other pair of trolley devices are adhered to the cardboard panel (100) at the rear portion thereof, at that time being able to speed it up and then slow it down. In this way, the cardboard panel (100) is deposited on top of the stack deposited on the second conveyor (9), preventing it from forcefully striking the stop (90) and preventing the previous cardboard panel (100) from colliding with it.

The details, shapes, dimensions and other accessory elements, used to manufacture the trolley device of the invention, may be suitably substituted for others which do not depart from the scope defined by the claims which are included below.

NUMERICAL REFERENCES 1. trolley device
2. belt
20. through holes
21. central channel
3. pulley
4. frame
5. supporting region
50. windows
6. projecting section
60. through holes
7. longitudinal ribbing
8. first conveyor
9. second conveyor
90. stop
10. servomotor
100. cardboard panels

What is claimed is:

1. A trolley device for conveying laminar elements, the trolley device comprising:
    at least one belt that defines a closed loop,
    a plurality of pulleys, at least one drive pulley being configured to act on the belt, the pulleys being mounted on a frame with a supporting region over which a section of the belt can be slid and wherein suction means linked to the belt are provided,
    wherein the belt comprises at least on the outer face thereof a projecting section of predetermined length that protrudes in height with respect to the rest of the belt, the projecting section being provided with a plurality of through holes aligned in position with through holes made in the belt.

2. The trolley device according to claim 1, further comprising a plurality of projecting sections spaced apart and distributed along the length of the belt.

3. The trolley device according to claim 1, wherein the supporting region includes windows associated with the suction means, the windows being configured for fluid communication between the suction means and the through holes made in the projecting sections, including a sealing system between the supporting region and the belt.

4. The trolley device according to claim 3, wherein the sealing system comprises a longitudinal ribbing arranged along the length of the supporting region, which defines a central space wherein the windows are arranged, over which a bottom smooth surface of the belt formed by a central channel made in the toothing of the belt slides and over which a sliding material is adhered, the central channel being able to fit in the longitudinal ribbing of the central area of the supporting region.

5. The trolley device according to claim 1, further comprising two belts arranged parallel to each other, wherein each belt is associated with a plurality of pulleys that act in a synchronized manner.

6. A conveyor assembly for conveying laminar elements, the conveyor assembly comprising:
- a trolley device for conveying laminar elements, the trolley device comprising:
  - at least one belt that defines a closed loop,
  - a plurality of pulleys, at least one drive pulley being configured to act on the belt, the pulleys being mounted on a frame with a supporting region over which a section of the belt can be slid and wherein suction means linked to the belt are provided,
  - wherein the belt comprises at least on the outer face thereof a projecting section of predetermined length that protrudes in height with respect to the rest of the belt, the projecting section being provided with a plurality of through holes aligned in position with through holes made in the belt; and
  - suction means and drive means that act on at least one drive pulley of the trolley device.

7. The conveyor assembly according to claim 6, further comprising a plurality of trolley devices arranged in series.

8. The conveyor assembly according to claim 6, further comprising a plurality of trolley devices arranged parallel to each other.

9. The conveyor assembly according to claim 6, further comprising a plurality of trolley devices arranged in series and in parallel.

* * * * *